United States Patent
Kao et al.

(10) Patent No.: US 8,496,355 B2
(45) Date of Patent: Jul. 30, 2013

(54) REFLECTOR ELEMENT OF LIGHTING UNIT

(76) Inventors: Hsueh-Chung Kao, Tainan (TW);
Chao-Jen Wang, Tainan Hsien (TW)

( * ) Notice: Subject to any disclaimer, the term of this patent is extended or adjusted under 35 U.S.C. 154(b) by 879 days.

(21) Appl. No.: 12/644,022

(22) Filed: Dec. 22, 2009

(65) Prior Publication Data
US 2010/0165631 A1 Jul. 1, 2010

(30) Foreign Application Priority Data

Dec. 25, 2008 (TW) ................................. 97150573 A

(51) Int. Cl.
*F21V 29/00* (2006.01)
*H01J 5/16* (2006.01)

(52) U.S. Cl.
USPC ............................ 362/294; 313/110; 362/800

(58) Field of Classification Search
USPC .................. 313/110–113; 362/294, 231, 235, 362/355, 307, 308
See application file for complete search history.

(56) References Cited

U.S. PATENT DOCUMENTS

2007/0297171 A1 * 12/2007 Berben et al. ................. 362/231

* cited by examiner

*Primary Examiner* — Joseph L Williams
(74) *Attorney, Agent, or Firm* — Leong C. Lei

(57) ABSTRACT

A reflector element is provided for a lighting device and includes a light transmission/reflection component that includes a light conductor containing therein light diffusion particles. The light transmission/reflection component includes a light entrance section, a light transmission/reflection section, and a light emission section. The reflector element is coupled to a light-emitting diode (LED) lighting unit, or a heat dissipation element, or a cover. The light entrance section of the reflector element is set in front of the LED lighting unit and the light transmission/reflection section is set at an opposite side to the light entrance section in order to redirect an incident light to the light emission section. Due to the effect provided by the light diffusion particles for refraction, light is uniformly distributed and emitted through the cover.

15 Claims, 8 Drawing Sheets

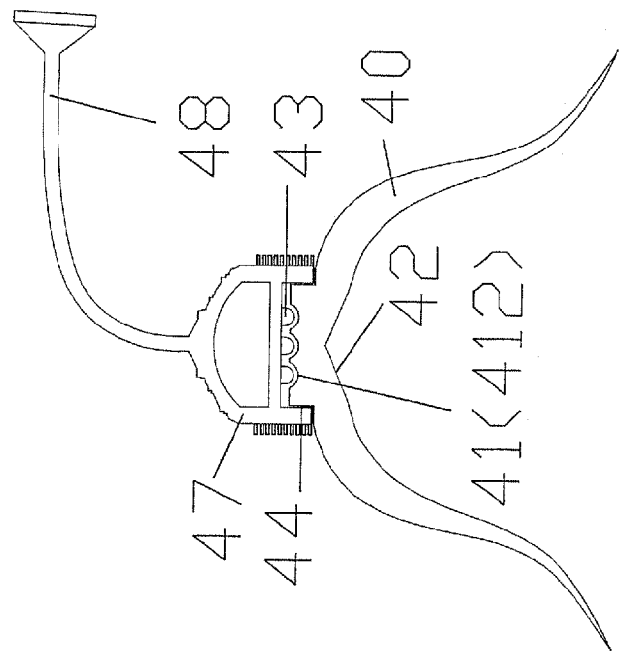
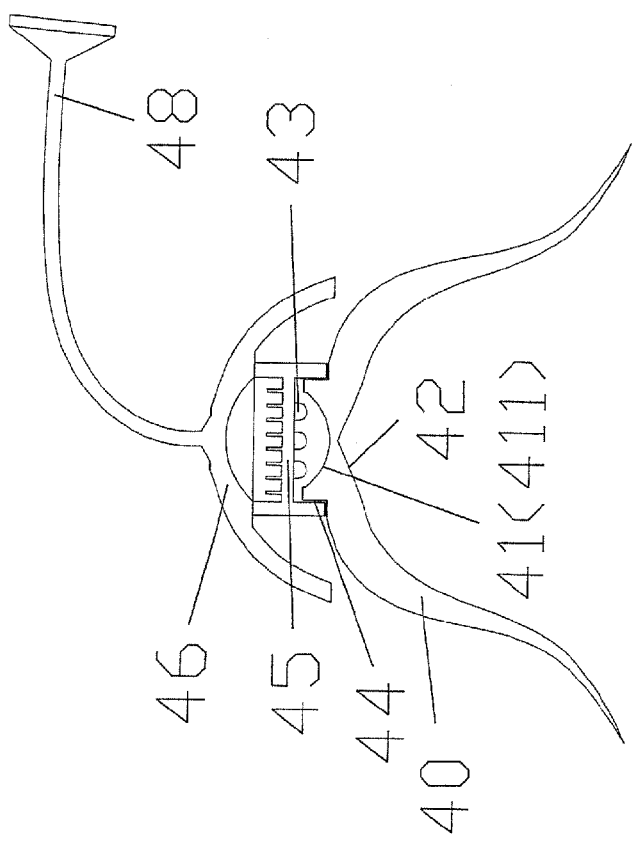
FIG.4B
FIG.4A

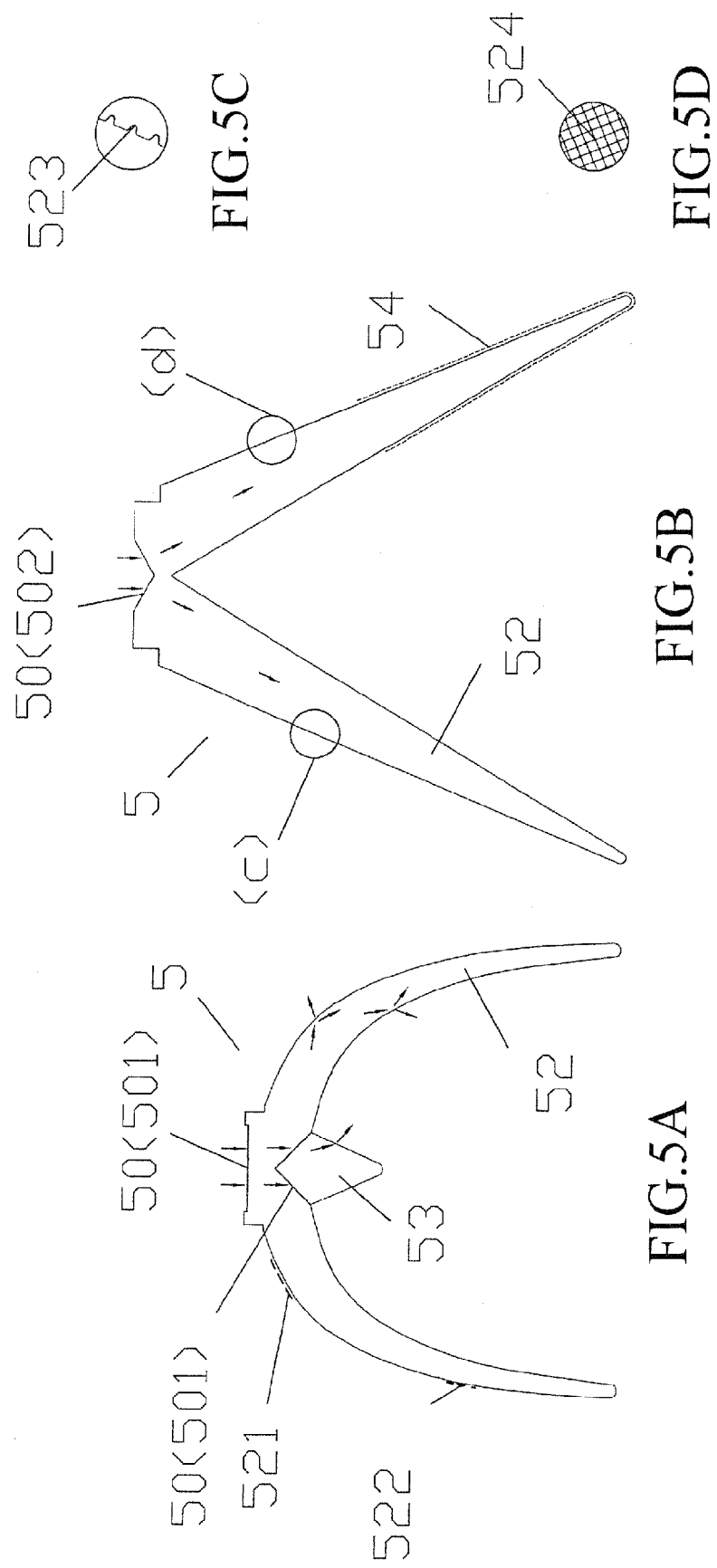

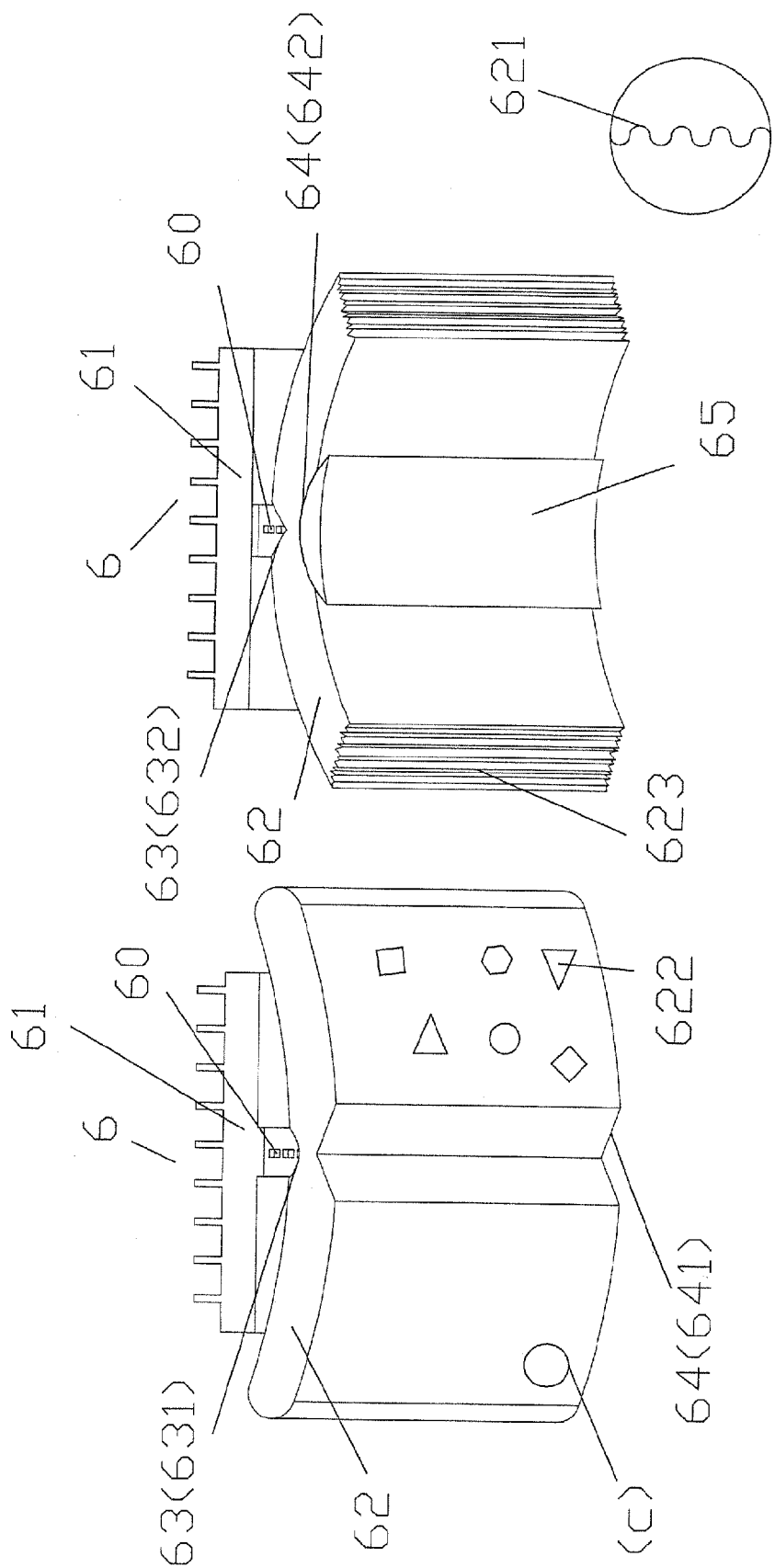

REFLECTOR ELEMENT OF LIGHTING UNIT

(a) TECHNICAL FIELD OF THE INVENTION

The present invention generally relates to a reflector element of lighting unit, and more particularly to a light conductor containing therein light diffusion particles, which uses a light source constituted by light-emitting diode (LED) based lighting element and realizes distribution of light energy and increase of irradiation angle and lighting area through arrangement of a light receiving section, a light transmission/reflection section, and a light emission section or alternatively a secondary light emission member, and alternatively realizes direct light emission and lighting through arrangement of properly shaped reflector element.

(b) DESCRIPTION OF THE PRIOR ART

Atmosphere enhancing lighting devices commonly used in daily living comprises a lighting unit, which can be for example a traditional incandescent bulb, a sharp tip shaped bulb, and a helical or multi-U shaped electronic power saving bulb that often contains mercury. Each individual lighting unit provides a specific light shape and is properly arranged in a lamp. Due to the trend of environmental protection and energy conversation, the conventional lighting units discussed above will be soon replaced and prohibited for future use.

Referring to FIG. 1, an exploded view of a conventional lighting device is shown. The lighting device, which is one of the most commonly known lighting devices, is supported by a support fixture 13 in which a threaded socket 12 that functions to couple a lighting unit and transmit electricity is arranged. A glass shade 11 is then fit outside the socket and an incandescent bulb 10 has a helical base is set in threaded engagement with the socket 12 to complete an incandescent lighting device 1.

Referring to FIG. 2, a cross-sectional view of a conventional wall-mounted lighting device 2 is shown. The lighting device 2 comprises a base 21 that is fixed to a wall 23 by bolts 211. An incandescent bulb 20 having helical conductive base is screwed into a helical conductive socket of the base 21. A frosted cover board 22 is then fixed to the base 21 by bolts 221 to complete the assembling of the wall-mounted lighting device 2.

SUMMARY OF THE INVENTION

The present invention provides a reflector element for a lighting device, which comprises a light conductor containing therein light diffusion particles and has at least a light entrance section, a light transmission/reflection section, and a light emission section. The reflector element is coupled to a light-emitting diode (LED) lighting unit, or a heat dissipation element, or a cover. The light entrance section of the reflector element is set in front of the LED lighting unit and the light transmission/reflection section is set at an opposite side to the light entrance section in order to redirect an incident light to the light emission section. Due to the effect provided by the light diffusion particles for refraction, light is uniformly distributed and emitted through the light emission section. Alternatively, a secondary light emission member can be provided in the front side to enhance spreading of the forward-traveling light from the LED lighting unit and to redirect intensive light energy back to the reflector element to provided enhance light softening effect of the lighting device.

The primary object of the present invention is to provide a reflector element for a lighting device, wherein the reflector element is capable of changing the direction of light to enhance overall lighting angle of an LED lighting unit and wherein the reflector element comprises a light emission section that provides a major constituent component of a particularly shaped lighting device to be mounted in front of the LED lighting unit.

A secondary object of the present invention is to provide a reflector element for a lighting device, wherein the reflector element is set in a flat form. An LED lighting unit is made flat and miniaturized. Due to the improvement of light conversion efficient, the volume of a heat dissipater is also made compact. Thus, the whole lighting unit takes a less amount of space and can be easily attached to a wall or ceiling.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4A shows a third embodiment of the present invention.

FIG. 4B shows a fourth embodiment of the present invention.

FIG. 5A shows a fifth embodiment of the present invention.

FIG. 5B shows a sixth embodiment of the present invention.

FIG. 5C shows an enlarged view of circled portion A of FIG. 5B.

FIG. 5D shows an enlarged view of circled portion B of FIG. 5B.

FIG. 6A shows a seventh embodiment of the present invention.

FIG. 6B shows an eighth embodiment of the present invention.

FIG. 6C shows an enlarged view of circled portion C of FIG. 6A.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
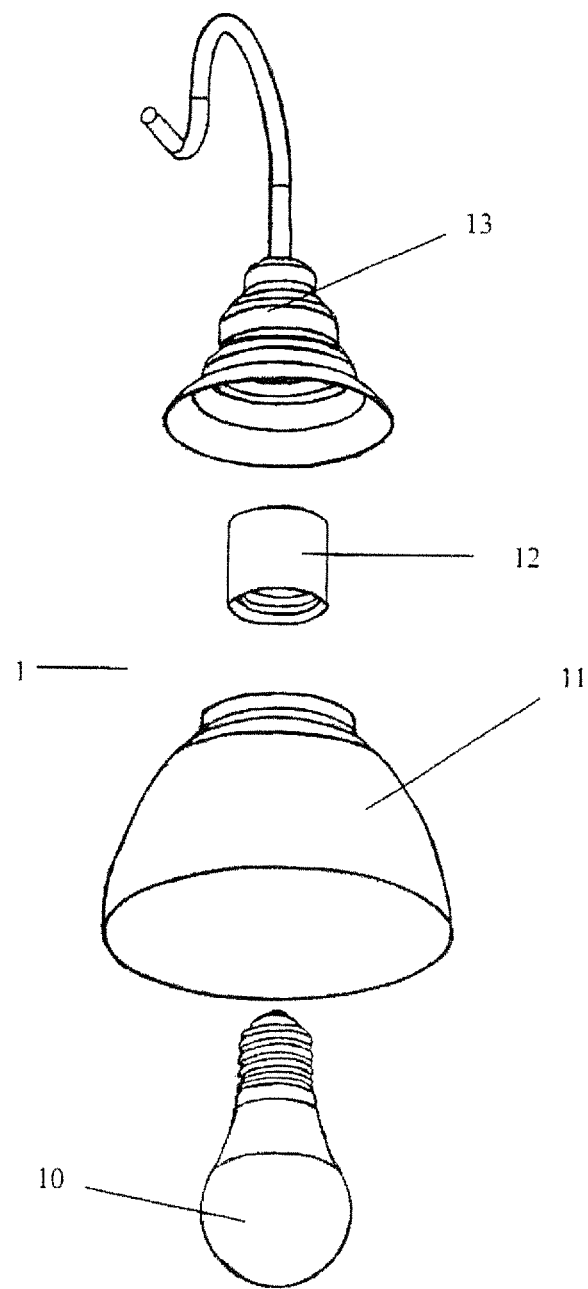
FIG. 1 is an exploded view of a conventional lighting device.
Figure 2:
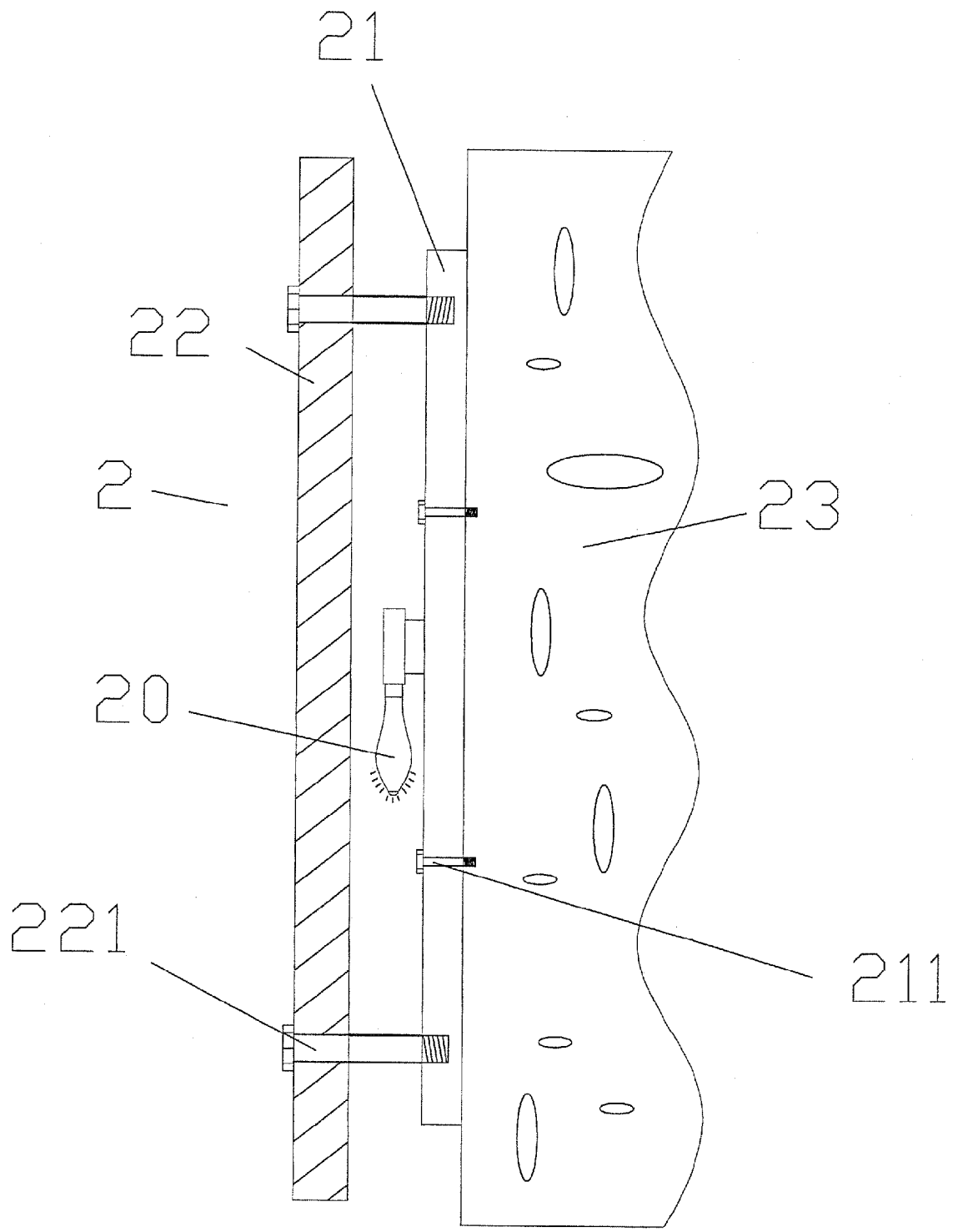
FIG. 2 is a cross-sectional view of a conventional lighting device.
Figure 3A:
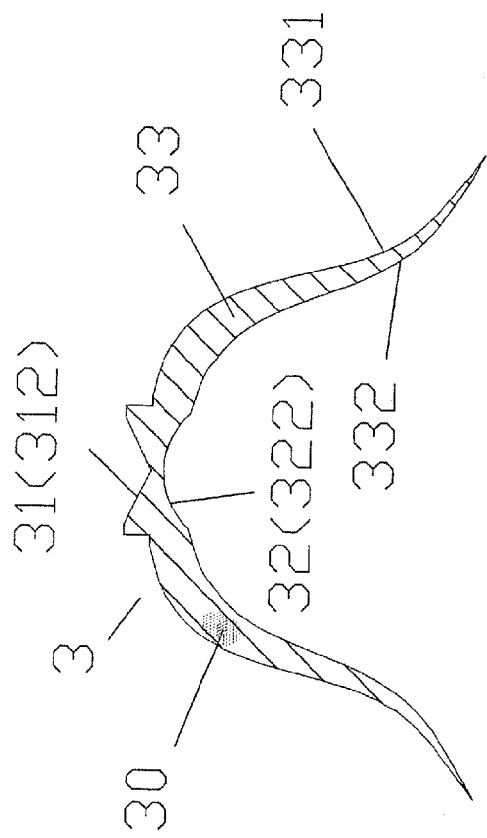
FIG. 3A show a cross-sectional view of a first embodiment of the present invention.
Figure 3B:
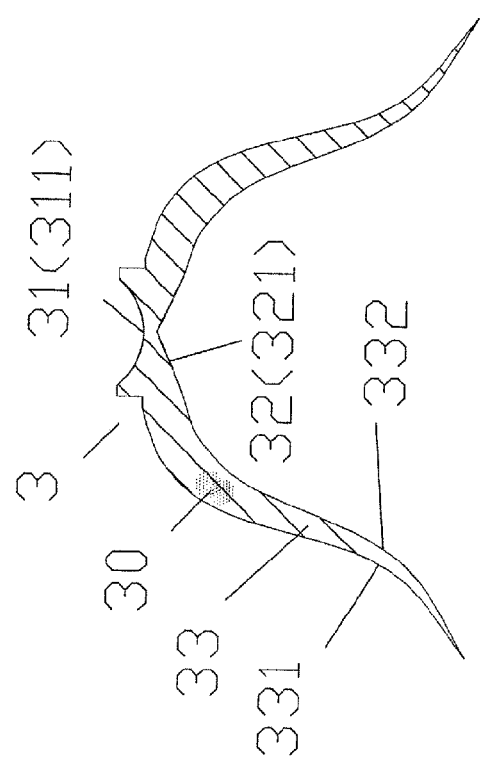
FIG. 3B show a cross-sectional view of a second embodiment of the present invention.

Referring to FIGS. 3A and 3B, which show cross-sectional views of reflector element in accordance with first and second embodiments of the present invention, the reflector element of the present invention provides a light transmission/reflection component 3, which comprises at least a light entrance section 31, a light transmission/reflection section 32, and a light emission section 33.

The light entrance section 31, of which the number can be one or more than one to form a combination, is arranged in front of a center of a light shape generated by a lighting unit to receive incident light from the lighting unit into the light transmission/reflection component.

The light transmission/reflection section 32, of which the number can be one or more than one, is set at an opposite surface in the front side of the light entrance section 31 to reflect and redirect the received incident light sideways.

The light emission section 33, of which the number can be one or more than one, is set at one side of the light entrance section 31 and the light transmission/reflection section 32 to process the light energy transmitted inside the light transmission/reflection component by means of light diffusion particles 30 contained therein so as to uniformly refract and redirect the light energy out of the light transmission/reflection component 3. To accommodate different arrangement of light source and desired locations where the incident light is to be guided to, the light entrance section 31 can be arranged in the form of a concave arc recess 311 (see FIG. 3A) or a inclined flat-sided prismatic recess 312 (see FIG. 3). The geometric structure of the light entrance section 31 provides an optic effect to the incident light to uniformly refract and redirect the incident light to the light transmission/reflection section 32. To allow the incident light that travel frontwards to change traveling direction without completely shielding straightforward traveling light components, the portion where the incident light is guided to structured in the form of a prismatic body 321 (see FIG. 3A) or an circular curved body 322 (see FIG. 3B). This, together with the interface reflectivity of the material, effectively refracts and redirects most of the incident light to the sideway light emission section 33 with a minor portion of the light being allowed to transmit through the light emission section 33 and refracted to travel frontwards. Due to the light transmission/reflection component 3 being a light conductor containing light diffusion particles 30 therein, light that is guided here from the light entrance section 31 and the light transmission/reflection section 32 irradiates the light diffusion particles 30 and exhibits irregular refraction and reflection, by which light energy traveling through the light emission section 33 are given off through an outside light emission surface 331 and an inside light emission surface 332 to thereby provide a perfect light transmission/reflection component 3. The light transmission/reflection section 32 of the preset invention can be set in the form of an inclined curved shaped body or a cone-like multi-side inclined-flat-surfaced body or a multi-side curved-surfaced body or the likes. The light transmission/reflection section 32 can alternatively be in the form of a regular convex circular shape or an inclined-curved prismatic recess like shape or a horizontal or inclined-flat hole or an inclined-curved hole or the likes.

Referring to FIGS. 4A and 4B, which show third and fourth embodiments of the present invention respectively, an LED lighting unit 43 is formed of an arrayed module of a plurality of LED's. The LED lighting unit 43 can be provided with different light entrance section 41 according to the light energy emitted from the arrayed module and the light entrance section 41 can be formed of a single light entrance section 411 (see FIG. 4A) or a plurality of light entrance sections 412 (see FIG. 4B) for properly guiding and distributing the light energy emitted from the LED lighting unit 43 to a light transmission/reflection section 42. The LED lighting unit 43 that is formed of an arrayed module emits a large amount of light energy and thus generates a large amount of waste heat. To reduce the potential risk of reducing the service life of the LED lighting unit 43 caused by the waste heat, the LED lighting unit 43 is coupled to a heat-dissipative cover 47 that has a structure and function for dissipation of heat. With the heat-dissipative cover 47 efficiently removing waste heat from the LED lighting unit 43, the operation stability and service life of the light source can be ensured. The heat-dissipative cover 47 can be coupled to a coupling section 44 of the reflector element 40 and is also coupled to a light fixture 18 to complete the assembling of a lighting unit 4 (see FIG. 4B). In case that the LED lighting unit 43 generates a huge amount of waste heat due to increase of power, the LED lighting unit 43 can be alternatively coupled to a heat dissipation element 45 that exhibits excellent capability of removal of heat and further coupled to an outer cover 46 that is mounted to the light fixture 48 and afterwards, the coupling section 44 of the reflector element 40 is coupled to the heat dissipation element 45 to complete the assembling of the lighting unit 4 (see FIG. 4A). The light entrance section 41 of the light transmission/reflection section 42 can be independent, continuous, or a combination of both.

Referring to FIGS. 5A and 5B, which show fifth and sixth embodiments of the present invention respectively, when light is projected to a flat light entrance section 501 of the light entrance section 50 (see FIG. 5A), the light travels in a straight line to the light transmission/reflection section 51 and a portion of the light energy transmits through the light transmission/reflection section 51 and emits outwards, while the other portion of the light energy is re-directed to sides of the light transmission/reflection section 51 due to an optic effect of reflection induced by structural surfaces of the light transmission/reflection section 51, so that the light energy are guided into the light emission section 52 and subjected to repeated reflection. Afterwards, the light energy is refracted and guided out of the light emission section 52 due to the nature of the material of the reflector element 5 itself. To make the reflector element 5 versatile in commercial application, the light emission section 52 can be coated with a color layer 521 and/or projections 522. With such externally attached objects, product aesthetics and application of the reflector element 5 can be enriched. Further, to convert the frontward-emitting light, which is considered harsh and dazzling to human eyes, into sideway lights, a secondary light emission member 53 that possesses a micro-structure layer is provided, so that the light energy transmitted through the light transmission/reflection section 51 is subjected to refraction by the geometric structure of the secondary light emission member 53 and the frontward-emitting light energy, which may be of an excessive amount, is re-directed sideways to soften the light shape of the reflector element 5. Further, to prevent the light energy from excessive loss caused by repeated interface reflection, the light emission section 52 (see FIG. 5B) can be made linear to facilitate the propagation of light energy and further, the light entrance section 50 can be set in the form of inclined flat-side conic recess 502 showing an optimum incidence angle according to an optimum angle for light transmission of the light emission section 52. Versatility of a product is the trend for the future commerce. In this respect, the surface of the light emission section 52 can be made in the form of serration 523 (see FIG. 5C) or prismatic recesses/projections 524 (see FIG. 5D), so that the light shape transmitting through the light emission section 52 shows shades due to overlapping of light energy. To extend the lifespan of the reflector element 5 and to protect the surface of the light emission section 52 from damage caused by frequent cleaning and wiping, the surface of the light emission section 52 can be coated with a light-transparent hardening layer 54.

Referring to FIGS. 6A and 6B, which show seventh and eighth embodiments of the present invention, to expand the application of the lighting unit for replacing the conventional incandescent bulb, the reflector element can be modified to provide a board like reflector element 6 that resembles a planar light source. The lighting unit can take advantage of the flattened feature of an LED lighting bar 60 so that the lighting unit can be easily attached to a wall or a ceiling. The LED lighting bar 60 is attached to a heat dissipation element 61 in order to use the heat dissipation element 61 to efficiently remove waste heat generated by the LED lighting bar 60. The LED lighting bar 60 is set at a position in front of a continuous concave circular arc recess 631 (see FIG. 6A) of a light entrance section 63. A light transmission/reflection section 64, which is set in the form of a continuous inclined flat-sided prismatic recess 641 is provided at an opposite side to the continuous concave circular arc recess 631. A light emission section 62 is arranged at one side of the light entrance section 63 and the light transmission/reflection section 64. To make the lighting unit beautiful, the surface of the light emission section 62 is provided with a translucent color layer having holes 622 showing light-shielding patterns. As such, the light projected forms patterned shades on the location where the light is projected. To obtain softened light shape, the surface of the light emission section 62 is provided with micro-level surface micro-structure 621 (also see FIG. 6C), which softens the projection light. To provide versatility of designs of light, the light entrance section 63 can be modified as a continuous inclined flat-side prismatic recess 632 (see FIG. 6B) and the light transmission/reflection section 64 is modified as a continuous concave circular arc recess 642 by which the amount of light energy reflected into the light emission section 62 can be adjusted. The end surfaces of the light emission section 62 can be provided with a ridged structure 623, which induce overlapping of light energy due to intersections of light emission angles, leading to variability of light shape. Further, a secondary light emission member 65 can be set on the light transmission/reflection section 64 so that excessive amount of straight-traveling light can be subjected to refraction and spreading caused by the secondary light emission member 65. The secondary light emission member 65 can be made of acrylic, polycarbonate, silicon-based glass, or other different materials showing different capability of light conduction. Use of a plurality of materials in combination provides even wider application.

Figure 7A:
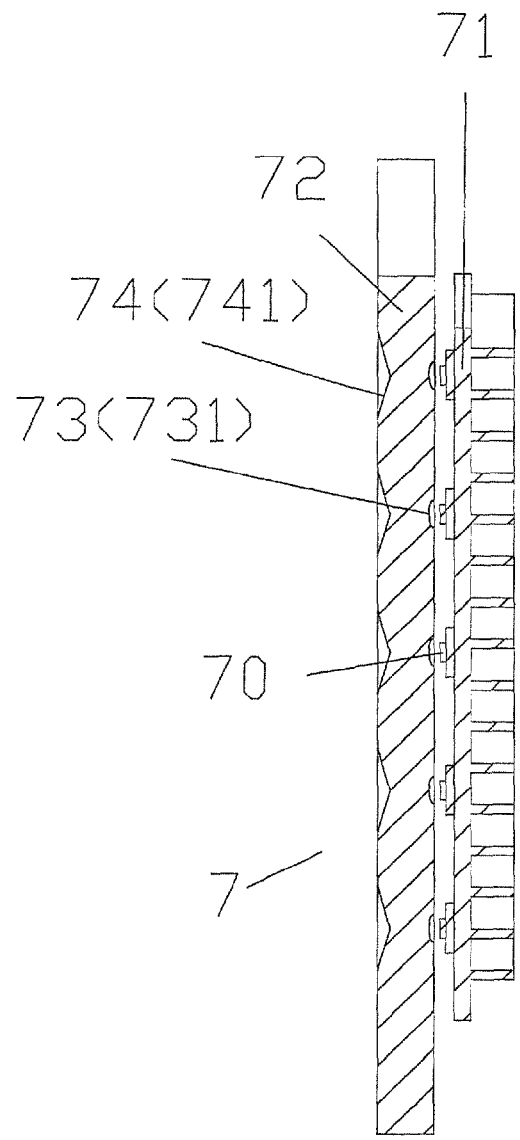
FIG. 7A shows a ninth embodiment of the present invention.
Figure 7B:
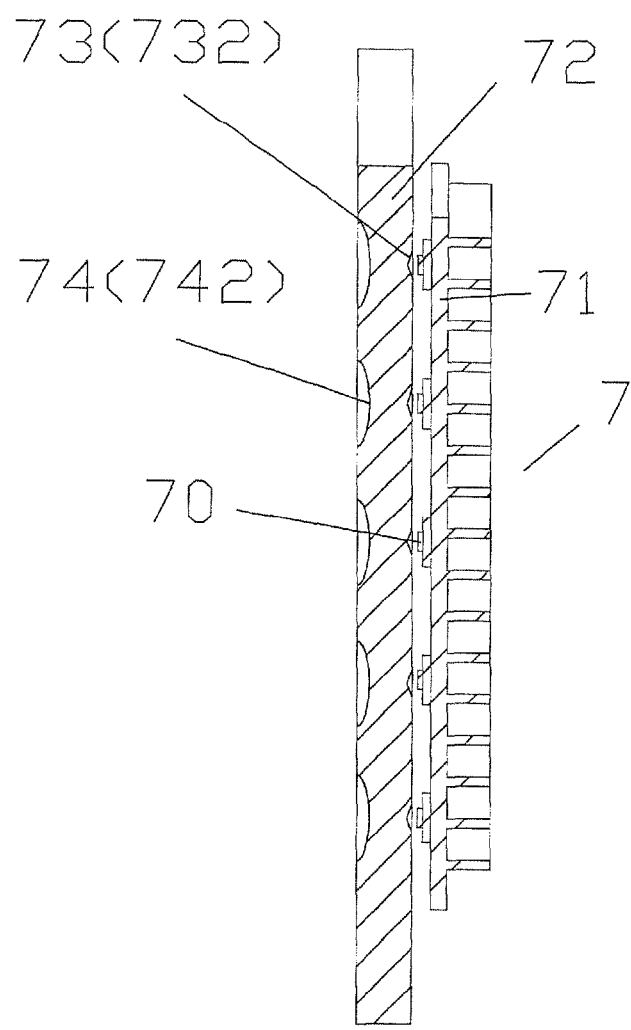
FIG. 7B shows a tenth embodiment of the present invention.

Referring to FIGS. 7A and 7B, which show ninth and tenth embodiments of the present invention respectively, when a lighting unit is to be presented in a flat form, the reflector element 72 can be made in the form of a flat board to combine with an LED lighting unit 70, as well as a heat dissipation element 71 coupled thereto, to be set in independent concave arc recesses 731 (see FIG. 7A) or independent inclined flat-side prismatic recess 732 (see FIG. 7B) of a light entrance section 73. Independent inclined prismatic recesses 741 (see FIG. 7A) or independent concave circular arc recesses 742 (see FIG. 7B) of a light transmission/reflection section 74 are formed on an opposite surface of the reflector element 72. With this arrangement, energy from each independent lighting unit of the LED lighting unit 70 can be uniformly distributed to create a board-like lighting unit 7 having a perfect light shape. When the board-like lighting unit 7 has an excessive surface area, to avoid occurrence of insufficient luminance due to insufficient amount of incident light energy, the reflector element 72 is provided with multiple rows of light entrance section 73, multiple rows of light transmission/reflection section 74, and multiple rows of LED lighting units associated therewith. (The arrangement of multiple rows is not shown in the drawings.)

Figure 8:
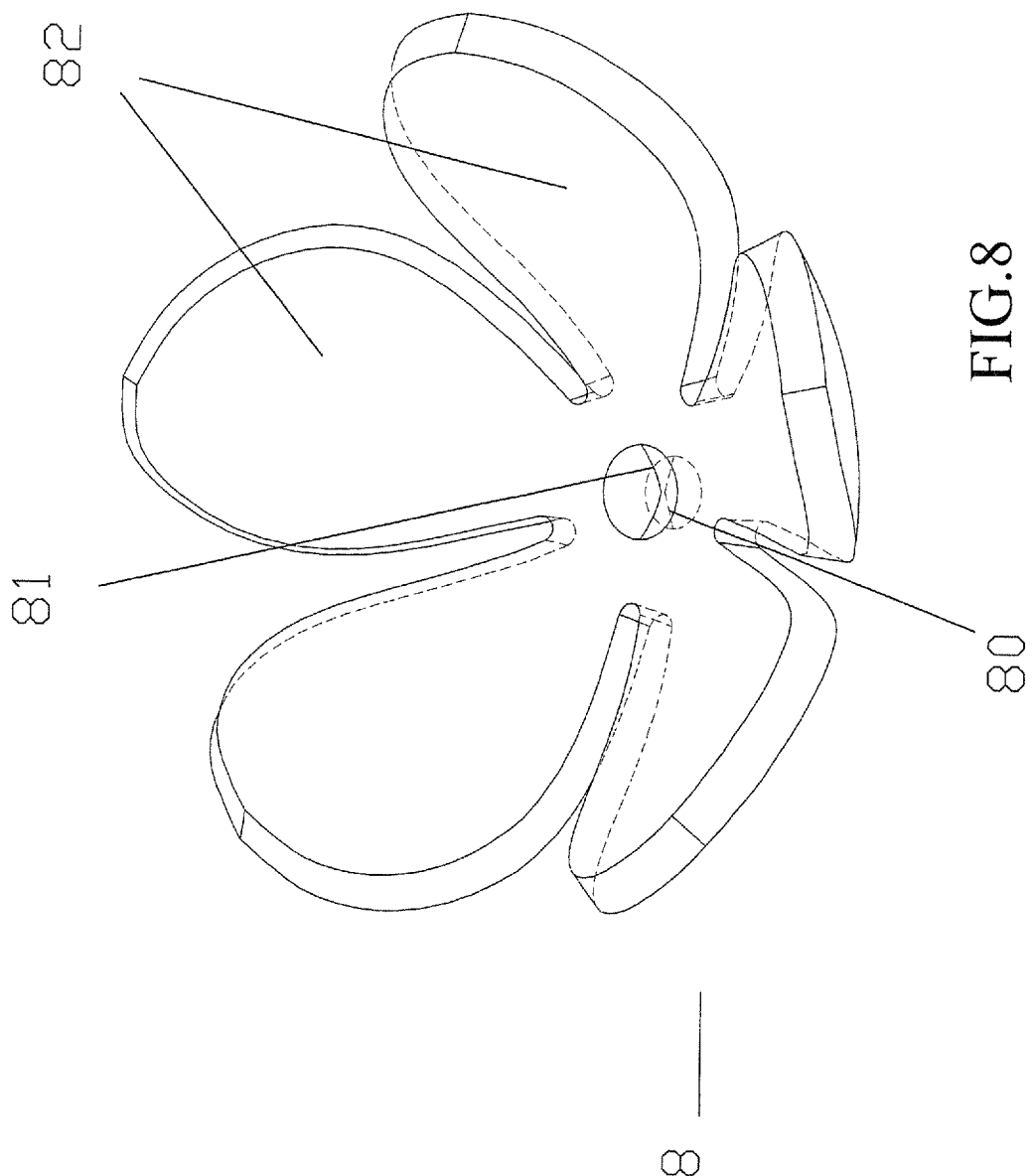
FIG. 8 shows an eleventh embodiment of the present invention.

Referring to FIG. 8, which shows an eleventh embodiment of the present invention, to expand the application of the lighting unit, the light emission section 82 of a reflector element 8 is made in the form of multiple independent units distributed along a side of the light entrance section 80 and the light transmission/reflection section 81. The multiple light emission sections 82 are arranged according to the requirement of variation of shape. Further, a number of reflector elements 8 can be combined in a stacked arrangement (which is not shown in the drawings) to provide a multi-layered artistic configuration, further expanding the application of the present invention.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A reflector element of a lighting device, comprising:
   a light transmission/reflection component, which a light conductor that allows complete transmission of light therethrough;
   a plurality of light diffusion particles, which is uniformly mixed and distributed in the entirety of the light transmission/reflection component;
   at least one light entrance section, which is formed on a surface of the light transmission/reflection component and is arranged in front of a center of a light shape generated by the lighting device to receive incident light into the light transmission/reflection component;
   at least one light transmission/reflection section, which is formed on an opposite surface of the light transmission/reflection component to be located in front of and spaced from the light entrance section to allow a portion of the received incident light to transmit therethrough and reflect and redirect a remaining portion of the received incident light sideways; and
   at least one light emission section, which is integrally formed at and extends sideways from one side of the light transmission/reflection component between the light entrance section and the light transmission/reflection section to receive the remaining portion of the incident light and to soften and homogenize the remaining portion of the incident light through reflection and diffusion caused by the light diffusion particles before the light exits the light emission section.

2. The reflector element according to claim 1, wherein the light transmission/reflection section of the light transmission/reflection component has a shape selected from a group consisting of a circular curved body, an inclined curved body, a prismatic body, a cone-like multi-side inclined-flat-surfaced body or a multi-side curved-surfaced body.

3. The reflector element according to claim 1, wherein the entrance section of the light transmission/reflection component is set in a form selected from a group consisting of a regular convex circular shape, an inclined-curved prismatic recess like shape, a horizontal or inclined-flat hole, an inclined-curved hole.

4. The reflector element according to claim 1, wherein the light transmission/reflection section of the light transmission/reflection component is independent, continuous, or a combination of both.

5. The reflector element according to claim 1, wherein the light entrance section of the light transmission/reflection component is independent, continuous, or a combination of both.

6. The reflector element according to claim 1, wherein the light transmission/reflection component further comprises a secondary light emission member optically couple to the light transmission/reflection section to provide configuration versatility and guide a fraction of the portion of light that is allowed to transmit through the light transmission/reflection section to travel sideways.

7. The reflector element according to claim 6, wherein the light emission section of the light transmission/reflection component and the secondary light emission member comprise a micro-structure layer, which helps improving light emission effect and creating shaded patterns.

8. The reflector element according to claim 6, wherein the light emission section of the light transmission/reflection component and the secondary light emission member comprise a color layer, by which shaded patterns are formed.

9. The reflector element according to claim 6, wherein the light emission section of the light transmission/reflection component and the secondary light emission member comprise a serration structure.

10. The reflector element according to claim 6, wherein the light emission section of the light transmission/reflection component and the secondary light emission member comprise a plurality of prismatic recesses showing diamond like light reflection effect.

11. The reflector element according to claim 6, wherein a surface of the light emission section of the light transmission/reflection component and a surface of the secondary light emission member are provided with projections attached thereto, the projections being colored to generate patterns.

12. The reflector element according to claim 1, wherein the light transmission/reflection component is made of a material selected from a group consisting of acrylic, polycarbonate, and silicon-based glass.

13. The reflector element according to claim 6, wherein the light transmission/reflection component and the secondary light emission member are made of a plurality of materials.

14. The reflector element according to claim 6, wherein the light transmission/reflection component and the secondary light emission member are completely coated with a hardening layer.

15. A reflector element of a lighting device comprising:
at least one light-emitting diode (LED) lighting unit, which is set in the lighting device to form a light condensation zone;
at least one heat dissipation element to which the LED lighting unit is coupled for removing thermal energy generated by the LED lighting unit; and
at least one light transmission/reflection component, which comprises a light conductor that allows complete transmission of light therethrough and comprises light diffusion particles uniformly distributed in the entirety thereof and is coupled to the heat dissipation element and located in front of a light emission direction of the LED lighting unit and comprises a light entrance section formed on a surface of the light transmission/reflection component for receiving incident light into the light transmission/reflection component and a light transmission/reflection section formed on an opposite surface of the light transmission/reflection component to be located in front of and spaced from the light entrance section to allow a portion of the received incident light to transmit therethrough and reflect and redirect a remaining portion of the received incident light sideways; and
at least one cover coupled to the heat dissipation element and the light transmission/reflection component.

* * * * *